US010511662B2

(12) United States Patent
Edwall et al.

(10) Patent No.: US 10,511,662 B2
(45) Date of Patent: *Dec. 17, 2019

(54) METHOD AND ARCHITECTURE FOR APPLICATION MOBILITY IN DISTRIBUTED CLOUD ENVIRONMENT

(71) Applicant: TELEFONAKTIEBOLAGET LM ERICSSON (PUBL), Stockholm (SE)

(72) Inventors: Thomas Edwall, Akersberga (SE); Benoit Tremblay, Laval (CA)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 15/912,894

(22) Filed: Mar. 6, 2018

(65) Prior Publication Data

US 2018/0198859 A1  Jul. 12, 2018

Related U.S. Application Data

(63) Continuation of application No. 14/423,202, filed as application No. PCT/IB2012/054721 on Sep. 11, 2012, now Pat. No. 9,942,320.

(51) Int. Cl.
*G06F 15/16* (2006.01)
*H04L 29/08* (2006.01)
(Continued)

(52) U.S. Cl.
CPC ........ *H04L 67/1095* (2013.01); *G06F 9/4856* (2013.01); *G06F 9/5072* (2013.01);
(Continued)

(58) Field of Classification Search
CPC ............. H04L 67/1095; H04L 47/2425; H04L 29/08072; H04L 29/06; H04L 29/08135
See application file for complete search history.

(56) References Cited

U.S. PATENT DOCUMENTS

| 6,578,076 B1* | 6/2003 | Putzolu | H04L 41/0213 709/219 |
| 2002/0046264 A1* | 4/2002 | Dillon | H04B 7/18584 709/219 |

(Continued)

FOREIGN PATENT DOCUMENTS

| EP | 2 498 540 A1 | 9/2012 |
| RU | 2 435 236 C1 | 12/2010 |
| RU | 2 453 916 C1 | 6/2012 |

OTHER PUBLICATIONS

Lai et al. (Dual migration for improved efficiency in cloud service; Mar. 19, 2012) (Year: 2012).*

(Continued)

*Primary Examiner* — Razu A Miah
(74) *Attorney, Agent, or Firm* — Patent Portfolio Builders PLLC (57) ABSTRACT

A method for moving application related records between distributed cloud domains when a user terminal changes its physical location and a predetermined condition is fulfilled. The user terminal is connected to a telecommunication network and uses an application (App). The method determines that a user terminal location has changed at least from a first network area of the telecommunication network to a second network area, considering one or more constraints associated with (i) a location of the user terminal in the second network area, (ii) a location of a cloud component of the application (App) in a first cloud domain associated with the first network area, and (iii) a location of a second cloud domain associated with the second network area, and moves, when the predetermined condition is fulfilled, the application related records from the first cloud domain to the second cloud domain.

20 Claims, 7 Drawing Sheets

(51) Int. Cl.
  *H04W 4/029* (2018.01)
  *G06F 9/48* (2006.01)
  *G06F 9/50* (2006.01)
  *H04L 12/851* (2013.01)
  *H04W 88/18* (2009.01)

(52) U.S. Cl.
  CPC .......... *H04L 47/2425* (2013.01); *H04L 67/10* (2013.01); *H04L 67/34* (2013.01); *H04W 4/029* (2018.02); *G06F 2209/502* (2013.01); *H04L 69/329* (2013.01); *H04W 88/18* (2013.01)

(56) References Cited

U.S. PATENT DOCUMENTS

| | | | |
|---|---|---|---|
| 2003/0120780 A1* | 6/2003 | Zhu | G06F 9/50 709/226 |
| 2004/0122967 A1* | 6/2004 | Bressler | H04L 47/10 709/232 |
| 2004/0196787 A1* | 10/2004 | Wang | F02D 33/003 370/229 |
| 2004/0230670 A1* | 11/2004 | Schmidt-Karaca | H04L 41/0816 709/220 |
| 2005/0240631 A1* | 10/2005 | Willard | H04L 41/0816 |
| 2007/0076601 A1* | 4/2007 | Wang | H04L 41/083 370/229 |
| 2007/0239695 A1 | 10/2007 | Chakra et al. | |
| 2008/0219268 A1* | 9/2008 | Dennison | H04L 12/4625 370/395.2 |
| 2010/0257227 A1* | 10/2010 | McLaughlin | G05B 23/0264 709/203 |
| 2011/0173328 A1 | 7/2011 | Park et al. | |
| 2011/0176528 A1* | 7/2011 | Lu | H04W 60/00 370/338 |
| 2011/0185063 A1* | 7/2011 | Head | G06F 9/5077 709/226 |
| 2011/0296018 A1* | 12/2011 | Deng | H04L 47/782 709/226 |
| 2012/0030313 A1* | 2/2012 | McGowan | H04L 67/10 709/219 |
| 2012/0150930 A1 | 6/2012 | Jin et al. | |
| 2012/0224694 A1* | 9/2012 | Lu | H04W 4/21 380/270 |
| 2012/0303740 A1* | 11/2012 | Ferris | H04L 29/06 709/217 |
| 2013/0222827 A1* | 8/2013 | Watanabe | G06F 3/122 358/1.13 |
| 2013/0222837 A1* | 8/2013 | Watanabe | G06F 3/1222 358/1.14 |
| 2013/0242725 A1* | 9/2013 | Rabie | H04L 41/0893 370/228 |
| 2014/0188971 A1* | 7/2014 | Aahlad | H04L 67/10 709/201 |
| 2014/0250229 A1* | 9/2014 | Prokopenko | H04L 47/788 709/226 |
| 2015/0244797 A1* | 8/2015 | Edwall | H04L 67/34 709/201 |

OTHER PUBLICATIONS

Church, Ken et al., "On Delivering Embarrassingly Distributed Cloud Services," Copyright 2008, ACM, http://conferences.sigcomm.org/hotnets/2008/papers/10.pdf.

International Search Report and Written Opinion, dated Aug. 12, 2013, from corresponding PCT Application No. PCT/IB2012/054721.

Lai, Wei Kuang et al., "Dual Migration for Improved Efficiency in Cloud Service," Proceedings of the 4th Asian Conference on Intelligent Information and Database Systems (ACIIDS), Kaohsiung, Taiwan, Part III, Mar. 19, 2012, Lecture Notes in Computer Science LNCS 7198, Springer-Velag Berlin Heidelberg, XP019174415, ISBN: 978-3-642-28492-2, pp. 216-225.

Office Action in corresponding Russian Application No. 2015113119/08(020557) dated May 16, 2016.

Oikonomou, Konstantinos et al., "Scalable Service Migration in Autonomic Network Environment," IEEE Journal on Selected Areas in Communications, vol. 28, No. 1, Jan. 1, 2010, pp. 84-94, XP011298922, ISSN: 0733-8716.

Search Report in corresponding Russian Application No. 2015113119/08(020557) dated May 16, 2016.

Steiner, Moritz et al., "Network-Aware Service Placement in a Distributed Cloud Environment," published in Newsletter, ACM SIGCOMM Computer Communication Review, Special October Issue SIGCOMM '12, vol. 42, Issue 4, Oct. 2012, pp. 73-74, ACM, New York, NY USA.

\* cited by examiner

METHOD AND ARCHITECTURE FOR APPLICATION MOBILITY IN DISTRIBUTED CLOUD ENVIRONMENT

TECHNICAL FIELD

The present invention generally relates to systems, software and methods and, more particularly, to mechanisms and techniques for running and/or moving an application across distributed cloud domains when a location of a user terminal that runs the application changes.

BACKGROUND

Cloud computing is the delivery of computing as a service rather than a product, whereby shared resources, software, and information are provided to computers and other devices as a utility over a network (e.g., the Internet) on a per need basis. Cloud computing describes a new consumption and delivery model for IT services based on Internet protocols, and it typically involves provisioning of dynamically scalable and often virtualized resources.

The increasing popularity of cloud computing, driven by the wide-spread adoption of continuous internet connectivity for both fixed and user terminals, has led to the development of applications that are tailored to run both on the user device and the cloud. The applications assume the continuous internet connectivity of the user terminals to the cloud. Initial usage of cloud computing was primarily for clients connected over fixed broadband networks, utilizing the connectivity over the internet to access content and applications residing in centrally located data centers.

With the adoption of mobile broadband as a natural and affordable service for end-users, in parallel with the launch of smart phones fueling the increased use of mobile data and smart applications ("Apps"), the everyday user of internet services is nowadays increasingly relying on the cloud for carrying out his/her daily business.

Thus, many current applications are using the cloud to offload the memory of the user terminal, take advantage of the computation power available in the cloud, save the power of the user terminal, or to achieve another advantage. These applications are designed to include a client component running on the user terminal and a server component running in the cloud. Further, the application is designed to reduce the extra communication between these two components. Examples of such applications are email services, desktop virtualization, online gaming, etc.

However, the connectivity to the internet and its quality are taken for granted and many popular applications rely on the always-on connectivity of the user terminal so that the application functions properly. While this may be the case for many locations, there are instances when the user terminal moves from one area to another area, which results either in the loss of internet connectivity or degradation of the quality of the internet connection. For these cases, a distributed cloud may improve the quality (e.g., the latency) of the internet connection. However, a distributed cloud is faced with other problems as discussed next. For example, because the distributed cloud has the resources distributed at certain locations, there are cases when different locations do not host the same resources. Thus, there is a need providing the necessary resources at any desired location of the distributed cloud for integrating distributed processing and network provisioning capabilities. This will provide an enhanced platform for the execution of applications with specific demands. Therefore, the distributed clouds will effectively bring the cloud closer to the end users.

Figure 1:
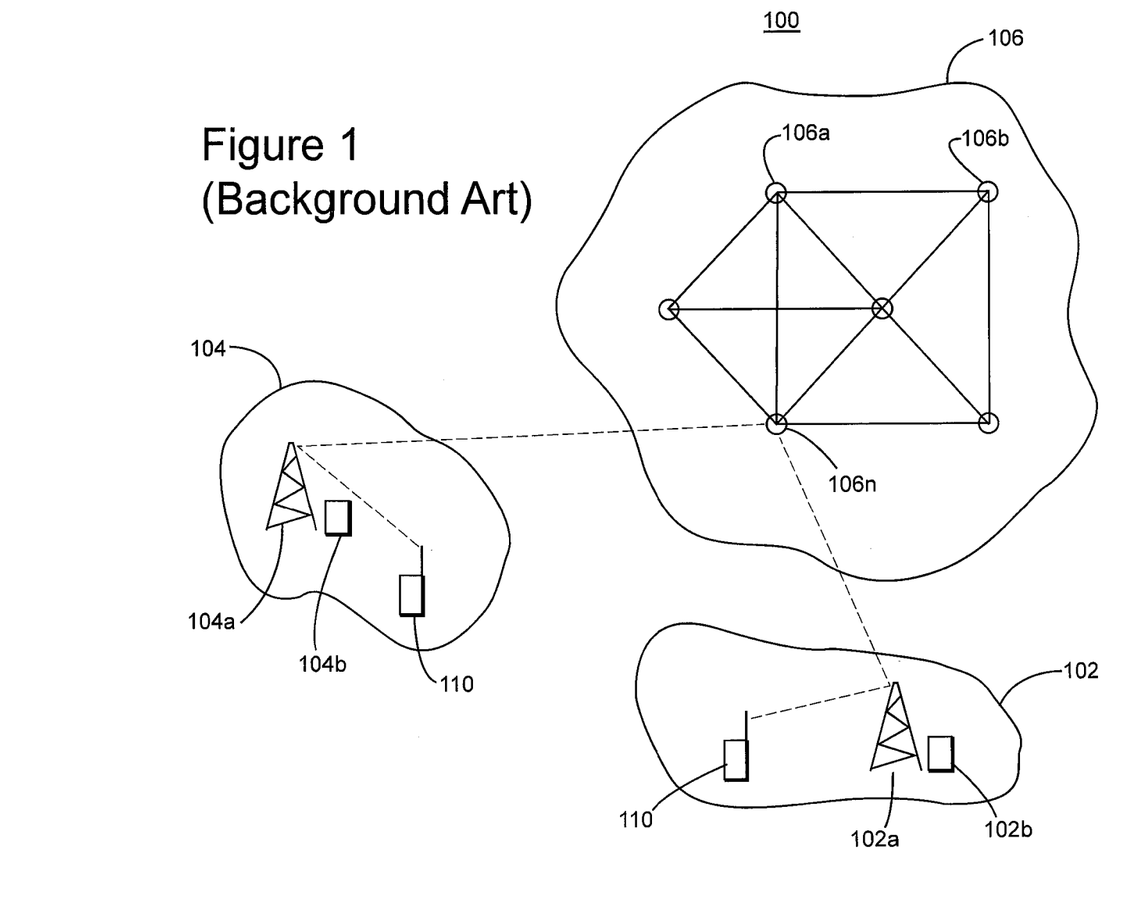
FIG. 1 is a schematic diagram illustrating plural cloud domains connected to a telecommunication network.

A distributed cloud 106, an example of which is illustrated in FIG. 1 as part of a system 100, deploys a smaller set of computing and storage resources (cloud domains 106a to 106n) at multiples locations rather than centralizing them in large data centers. This allows distributing the applications at different locations to better fulfill latency requirements and improve the interactions between the user terminals and the cloud applications. A telecommunication network 102 that includes at least a base station 102a and associated storage capabilities 102b, provides a user terminal 110 with the capability to use the resources of a cloud domain 106n. When the user 110 moves to another telecommunication network 104, the user terminal connects to another base station 104a having its storage capabilities 104b. The new base station 104a still connects to the original cloud domain 106n. Thus, a latency of the application run on the user terminal 110 may degrade.

The distributed cloud 106 might offer stable service level for the fixed devices but mobile users may observe a large variability in their usage experience as they move around in the network or out of the network. The latency or congestion in some part of the network may affect how the client component of the application on their device interacts with the server component.

Even though the system 100 aims at improving the end-user experience when utilizing cloud computing applications, it does not properly address the need to optimize the latency issues originating from the potentially quite long distance between the user terminal and the cloud component of the application, especially in the case of a roaming user.

Thus, there is a need to develop a mechanism or a method that coordinates the cloud computing resources, the application's needs, the locations of the user terminal, and the location of the cloud component of the application to improve the usage of the cloud and the quality of experience provided by the application to the user. Accordingly, it would be desirable to provide devices, systems and methods that avoid the afore-described problems and drawbacks.

SUMMARY

The distributed cloud domains offer their resources to enterprises and/or individual users for satisfying their computing needs. However, when applications have one or more components that run on the user terminal and one or more other components that run in the cloud, the user terminal moves from one area to another area, and the internet connection between the user terminal and the cloud domains may vary due to the user terminal's move, there is a need to coordinate which resource of the cloud is offered to the user terminal at the new location.

According to one exemplary embodiment, there is a method for moving application related records between distributed cloud domains when a user terminal changes its physical location and a predetermined condition is fulfilled. The user terminal may be connected to a telecommunication network and uses an application (App) that has a cloud component and a user component. The method includes a step of determining that a user terminal's location has changed at least from a first network area of the telecommunication network to a second network area. The second network area belongs either to the current telecommunication network or to another telecommunication network. The method also includes a step of considering one or more constraints associated with (i) a location of the user terminal in the second network area, (ii) a location of a cloud component of the application (App) in a first cloud domain associated with the first network area, and (iii) a location of a second cloud domain associated with the second network area. Based on this data, the method evaluates whether the one or more constraints fulfill the predetermined condition for the second cloud domain and for the first cloud domain. The method moves the application related records from the first cloud domain to the second cloud domain when a result of the evaluating step is positive for the second cloud domain and negative for the first cloud domain. The first and second cloud domains may belong to one or more distributed cloud providers.

According to another exemplary embodiment, there is a system for moving application related records between distributed cloud domains of a distributed cloud when a user terminal changes its physical location and a predetermined condition is fulfilled. The user terminal is connected to a telecommunication network and uses an application having a cloud component and a user component. The system includes a managing component configured to determine that a user terminal location has changed at least from a first network area of the telecommunication network to a second network area. The second network area belongs either to the telecommunication network or to another telecommunication network. The managing component receives information regarding one or more constraints associated with (i) a location of the user terminal in the second network area, (ii) a location of a cloud component of the application in a first cloud domain associated with the first network area, and (iii) a location of a second cloud domain associated with the second network area. The managing component decides whether the one or more constraints fulfill the predetermined condition for the second cloud domain and for the first cloud domain, and the managing component instructs, through a distributed cloud plane, a distributed cloud manager to move the application related records from the first cloud domain to the second cloud domain when a result of the evaluating step is positive for the second cloud domain and negative for the first cloud domain. The first and second cloud domains may belong to one or more distributed cloud providers.

According to still another exemplary embodiment, there is an infrastructure service embedded in a distributed cloud computing environment and a telecommunication network, for moving application related records between distributed cloud domains when a user terminal changes its physical location and a predetermined condition is fulfilled. The service implements the steps discussed above.

Thus, it is an object of an embodiment to overcome some of the deficiencies discussed in the previous section and to provide a mechanism and/or method and/or service that coordinates the resources of the distributed cloud, monitors the position of the user terminal, and takes into account the needs of the application so that a latency and/or quality of the experience offered by the application to the user is maintained at a high level. One or more of the independent claims advantageously provides such a method for offering a high quality experience to the user by moving application related records from a current cloud domain to a new cloud domain if a precondition is met.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION

The following description of the exemplary embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to the terminology and structure of a user terminal that connects in a wireless manner to a telecommunication network and the telecommunication network offers cloud computing resources.

Reference throughout the specification to "one embodiment" or "an embodiment" means that a particular feature, structure, or characteristic described in connection with an embodiment is included in at least one embodiment of the present invention. Thus, the appearance of the phrases "in one embodiment" or "in an embodiment" in various places throughout the specification is not necessarily all referring to the same embodiment. Further, the particular features, structures or characteristics may be combined in any suitable manner in one or more embodiments.

According to an exemplary embodiment, when a user terminal changes its location, e.g., from a network area to another network area, one or more constraints associated with a quality of service of an application run on the user terminal are evaluated, and application related records associated with the application are moved from a current distributed cloud domain to a new distributed cloud domain, based on a result of the evaluation of the one or more constraints. The application related records may include software code related to a cloud component of the application if the cloud component of the application is not hosted by the new distributed cloud domain. The application related records may include data related to the cloud component of the application if the cloud component of the application is already hosted by the new distributed cloud domain. These novel concepts are now discussed in more detail.

Figure 2:
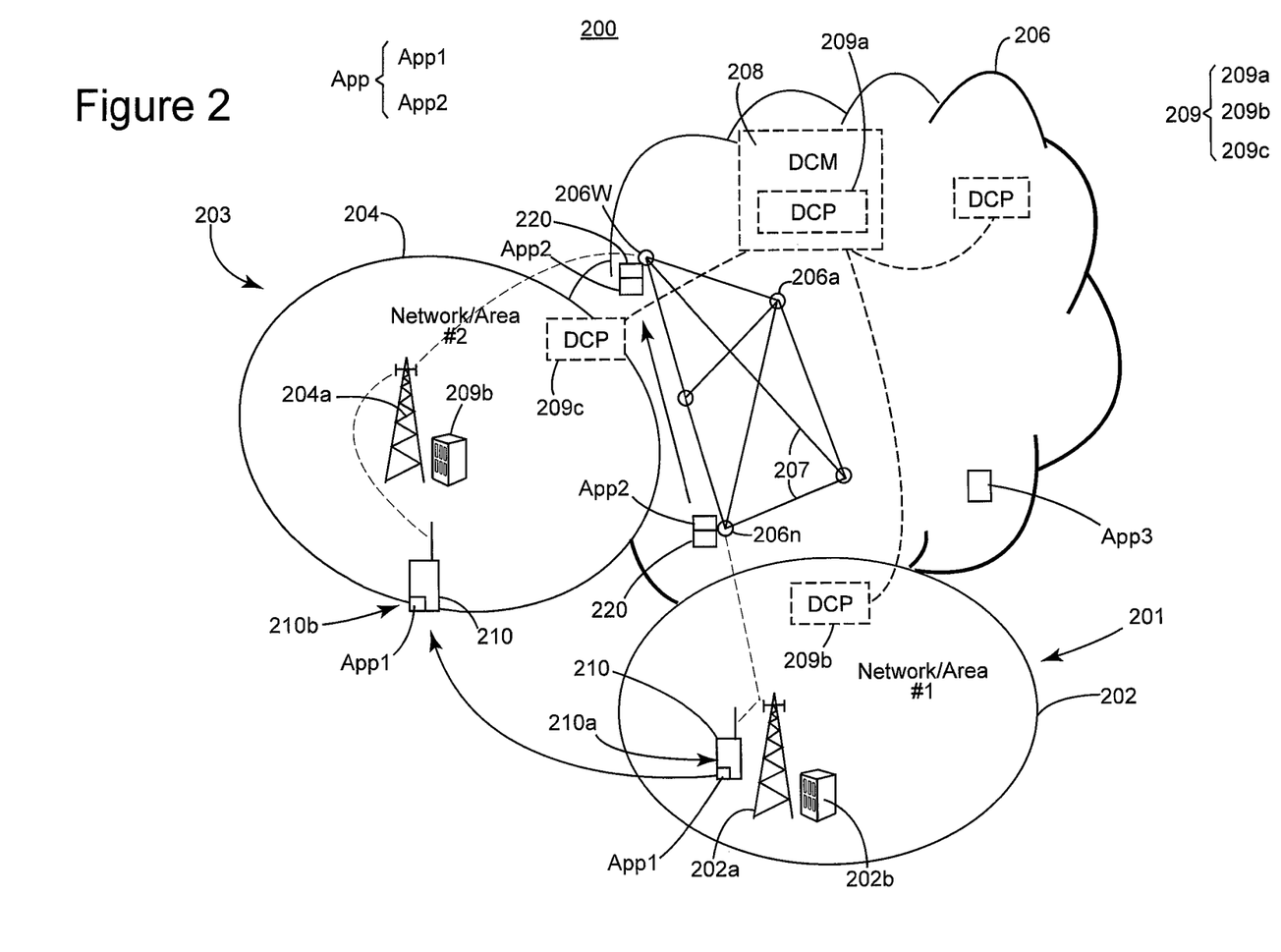
FIG. 2 is a schematic diagram illustrating moving application related records when triggered by a change in location of a user terminal according to an exemplary embodiment.

According to an exemplary embodiment illustrated in FIG. 2, there is a system 200 that includes a telecommunication network 201 and a distributed cloud 206. The telecommunication network 201 may be a 3rd Generation Partnership Project (3GPP) type network, or a mobile internet protocol (IP) type network, or any wireless network, e.g., Wifi, Wimax. The telecommunication network 201 includes at least a first network area 202. Customarily, the telecommunication network 201 includes many network areas. However, for simplicity, FIG. 2 shows only the first network area 202. Similarly, another telecommunication network 203 may include plural network areas. FIG. 2 shows only a second network area 204. In one application, the telecommunication network 201 and the telecommunication network 203 are the same network, i.e., operated by the same operator. In the following, the two networks 201 and 203 are considered to be operated by different operators. The novel features discussed herein equally apply to one or more telecommunication networks.

The first network area 202 may include a base station 202*a* and corresponding storage resources (e.g., memory, processor, etc.) 202*b*. The second network area 204 may have a similar structure. The term base station should be construe to include at least one of a node B (for a Universal Mobile Telecommunications System (UMTS)), eNode B (for a Long Term Evolution (LTE) system), base transceiver station (BTS) for a Global System for Mobile Communications (GSM), modem, router, or other devices (e.g., devices used in a machine-to-machine type of communication or network) that are known to provide internet connectivity to a user terminal.

A user terminal 210 is initially located at location 210*a* in the first network area 202. The use terminal 210 is a wireless device, e.g., a smart phone, a laptop, a personal digital assistant, a tablet, etc. The user terminal 210 communicates with the base station 202*a* for obtaining internet connectivity.

The distributed cloud 206 may include distributed cloud domains 206*a* to 206*w*. A distributed cloud domain, e.g., 206*a* may include processing and/or storage capabilities. Each distributed cloud domain may be located at a physical location that is different than a physical location of another distributed cloud domain. The distributed cloud domains are connected to each other through links 207. The distributed cloud domains 206*a-w* may be owned by the same operator or different operators. If the distributed cloud domains are owned by different operators, then, more than one distributed cloud 206 is involved. For simplicity reasons, the figures discussed herein show only one distributed cloud. However, the novel features are equally applicable to more than one distributed cloud.

Some of the distributed cloud domains may be in fact located within the telecommunication networks. For example, the storage resources 202*b* and/or 204*b* may accommodate one or more of the distributed cloud domains. These distributed cloud domains may be owned by the same owner as the telecommunication network or by the owner of the distributed cloud 206. FIG. 2 show for simplicity that all the distributed cloud domains are located in the distributed cloud 206.

The distributed cloud 206 includes various components for managing the distributed cloud domains. One such component is the Distributed Cloud Manager (DCM) 208. The DCM is an application/function that deploys a smaller set of computing and storage resources (e.g., processing, storage, etc.) in multiple domains in the distributed cloud 206 rather than centralizing them in large data centres. A DCM allows distribution of applications at different locations to better fulfill various requirements, e.g. latency requirements, and improve interactions between user terminals and cloud applications.

Another component for managing the distributed cloud domains is the distributed cloud plane (DCP) 209. The DCP is an entity that controls what cloud computing resources are available for a specific application. The DCP 209 has a distributed cloud component 209*a* and telecommunication network components 209*b* and 209*c*.

An application App that is run by the user terminal is considered to be a service offered by the telecommunication network's operator or by the distributed cloud's operator or by a third party, e.g., the application provider, in which case the application uses the functionality provided by the distributed cloud. The application App includes at least a user component App1 that runs on the user terminal and a cloud component App2 that runs on the distributed cloud domain 206*n*. The application App may also include a central component App3 that runs on a centralized cloud or another location of the distributed cloud 206. The fixed or centralized location can be taken into account in the evaluation of the constraints to be discussed later. In another embodiment, the fixed location for App3 may be deployed outside the distributed cloud.

When the application is obtained (e.g., purchased) by the user, a Service Level Agreement (SLA) is established between the user and the application's provider. The SLA specifies a set of parameters that need to be fulfilled for the application to provide desired quality of experience (QoE) results. For example, the set of parameters may include at least one of an application latency and/or application bandwidth, cost of delivery of the application at selected location, application size, application operating system, and available components at the selected cloud domain. Other sets of parameters may be considered as will be recognized by those skilled in the art. Thus, the application will deliver the expected results if the selected set of parameters is ensured when the application is run.

However, there are instances when the user terminal 210 moves from location 210*a* to another geographical location 210*b* as illustrated in FIG. 2. When the user terminal 210 changes its location as noted above, it is possible that a new distributed cloud domain 206*w* becomes more appropriate for hosting the cloud component App2 of the application App. Intelligence and associated managing functions (to be discussed with regard to FIG. 3) may be provided in the first network area 202 or its corresponding telecommunication network 201 for handling this aspect. In other words, the novel intelligence determines that the user terminal has changed its location, and evaluates whether one or more constraints associated with the application may be fulfilled if a new distributed cloud domain 206*w* is used instead of the current distributed cloud domain 206*n*.

The one or more constraints include at least one of network latency (associated with distance), network conditions (e.g., congestion, available network bandwidth), cloud resource availability (e.g, computing, storage, network), traffic pattern between the application and the user terminal, amount of data to be transferred, cost of cloud resources, mobile network signal strength, latency and bandwidth constraints for the application, etc. The one or more constraints are associated with (i) a location 210*b* of the user terminal 210 in the second network area 204, (ii) a location of the cloud component App2 of the application App in the current cloud domain 206*n*, and (iii) a location of the new distributed cloud domain 206*w*.

Two situations may arise as a result of the evaluation of the one or more constraints. If the one or more constraints fulfill a predetermined condition (to be discussed later), the intelligence decides to move application related records 220 from the current distributed cloud domain 206n to the new distributed cloud domain 206w. The application related records 220 may be software code related to the cloud component App2 of the application if the new distributed cloud domain 206w does not already host the application. However, if the new distributed cloud domain 206w hosts the application, then the application related records 220 may include data (various parameters) related to the application. After the application related records 220 are moved to the new distributed cloud domain 206w, the user component App1 of the application communicates with the cloud component App2 hosted by the new distributed cloud domain, which in effect improves or preserves the desired QoE of the user.

If the one or more constraints do not fulfill the predetermined condition, the intelligence decides either to move the cloud component App2 of the application App to a default cloud domain or to run the application in a degraded mode from the current distributed cloud domain (206n).

The predetermined condition requires that at least one parameter of the set of parameters has the same or a better value than a value of a corresponding constraint of the one or more constraints. For example, if the application requires a speed of 1 mb of data per second between the user terminal and the current distributed cloud domain, a speed of 0.5 mb between the user terminal and the new distributed cloud domain would prevent the intelligence to move the cloud component to the new distributed cloud domain. It is noted that the predetermined condition may include any number of parameters and the evaluation of the predetermined condition is triggered when the user terminal's location is changed.

A change in the user terminal's location is considered when the user terminal has moved from one cell to another cell, or from a group of cells to another group of cells, or from a city to another city, or from a region to another region, or from a country to another country.

Figure 3:
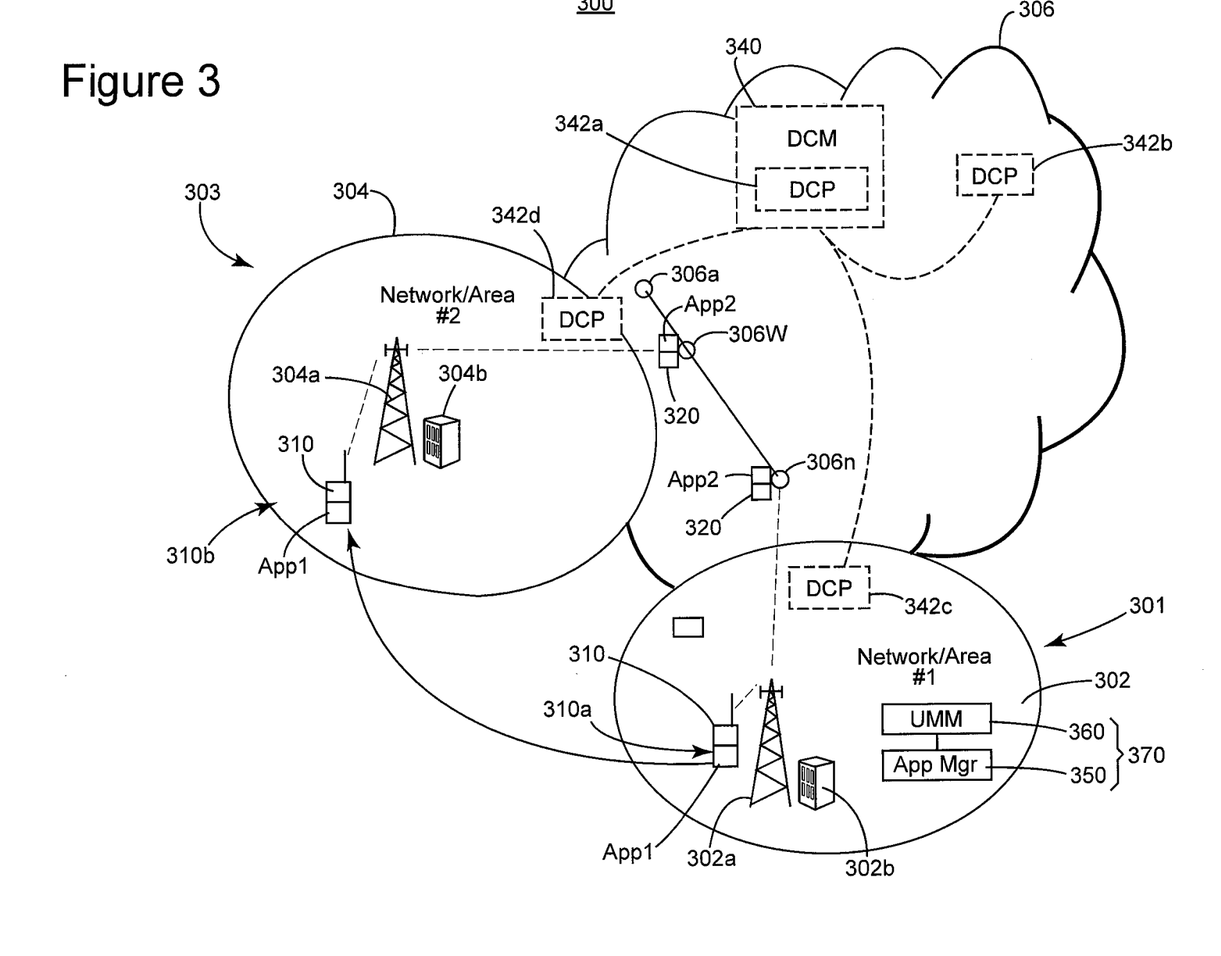
FIG. 3 is a schematic diagram illustrating various entities that move application related records from a current cloud domain to a new cloud domain according to an exemplary embodiment.

While the general concept of moving, from one distributed cloud domain to another one, either software code or data associated with an application has been discussed above with regard to FIG. 2, an implementation of such concept is now discussed in more detail. Thus, according to an exemplary embodiment, various processes and management units that may be involved with this novel concept are shown in FIG. 3. The description of the elements similar to those in FIG. 2 is omitted for simplicity. FIG. 3 shows an application manager 350 and a user mobility manager (UMM) 360 provided in the telecommunication network 301. These two entities form the management unit 370. The application manager 350 and the UMM 360 may be located in a central server of the telecommunication network 301, in the first network area 302 or they may be distributed across the telecommunication network. In another application, the application manager 350 may be controlled by the distributed cloud and possible be located on its own server in the distributed cloud.

The application manager 350 may be an entity that performs the following roles: A) registrar for the MobileAppSubscription (to be discussed later) which stores identities of the user terminal related to the application service, and B) judge for determining whether conditions for the user terminal's new location match criteria for moving the cloud component of the application. If a match is determined, the application manager 350 instructs the DCM 340 to initiate a move application procedure.

The UMM 360 is an entity that monitors in real-time the locations of the user terminals in the telecommunication network and calls the application manager 350 when a trigger condition for a new location of the user terminal is fulfilled for a certain subscription of a user terminal. In this respect, the system 300 illustrated in FIG. 3 may employ a MobileAppSubscription field or procedure and a MobileUserLocation field or procedure for keeping track of a user terminal's position, level of agreement, QoE, etc. In this regard, the MobileAppSubscription may be a record of subscription data related to a certain set of applications belonging to a user terminal. The MobileAppSubscriptions may be handled by the application manager. In this case, the UMM sends the new location of the user terminal to the application manager when its position changes. An optimization of the UMM/application manager communication may be implemented by setting an additional record in the UMM. This additional record identifies which user notifications to be sent to the application manager. The additional record may be added by the application manager when the user subscribes to at least one mobile application.

The applications are provided as a service to the user terminal and this service may be controlled by the MobileApp procedure in a distributed cloud environment. The applications may have associated service level agreement (SLA) requirements agreed upon with the telecommunication network's operator and/or the application provider and/or the distributed cloud's operator. By meeting these requirements, the telecommunication network fulfills the QoE expected by the user.

The MobileUserLocation may be a procedure that provides the last known geographical location of each user terminal and the last known geographical location of the corresponding MobileAppSubscription, e.g., the location of the cloud component of the application.

Having these entities in place, suppose that a user subscribing to the MobileApp service is moving within a telecommunication network, e.g., from one country to another or from one network area to another network area. The MobileApp service represents personalized cloud applications, i.e., the applications are tailor-made for the user and have desired requirements on the QoE. An example of an application that is tailor-made is when the user selects a given application, and out of ten parameters associated with the application, the user selects six of those parameters to have corresponding minimal or maximal values.

The MobileApp service provides a framework that allows to move software code (e.g., running code) and/or data pertaining to those applications as the user terminal moves around the network, in order to fulfill the QoE expected by the customer of that application. The move of the applications is triggered by a conditioned location change of the user. The execution of the application move is performed by a series of close interactions between entities of the MobileApp service and distributed cloud implementations over certain interfaces as discussed next with regard to FIG. 4.

Figure 4:
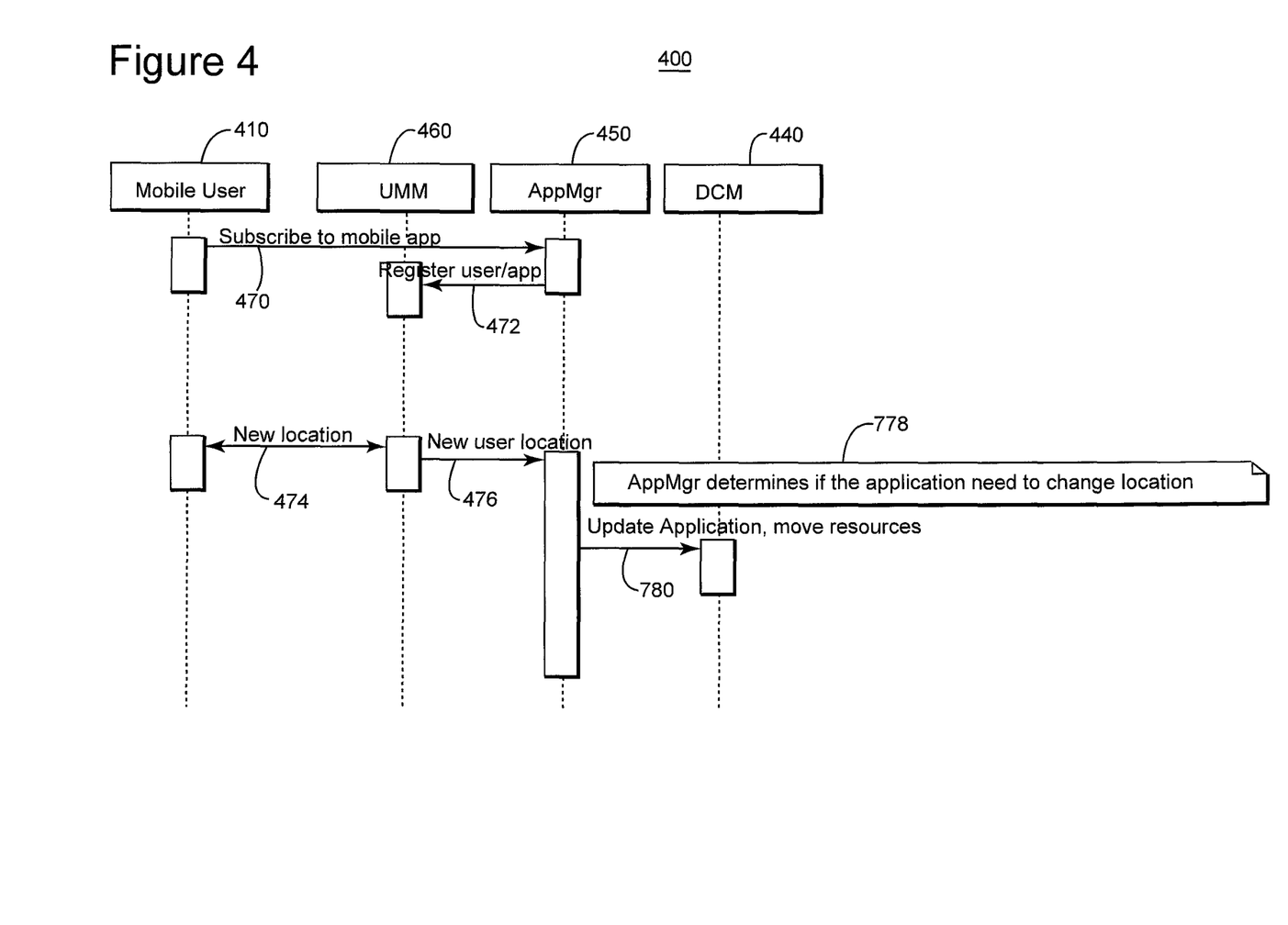
FIG. 4 is a schematic diagram illustrating various steps performed for moving application related records from a current cloud domain to a new cloud domain according to an exemplary embodiment.

FIG. 4 illustrates a system 400 that includes a user terminal 410, the UMM 460, the application manager 450, and the DCM 440. In step 470, the user terminal 410 subscribes to a certain application by sending a request to the application manager 450. The application manager 450 informs the UMM 460 in step 472 about this event and registers both the user terminal and the application creating the MobileAppSubscription. A certain QoE is expected by the user when signing on for any application and the QoE may be reflected by the SLA. Also, the user is associated with a first geographical location when receiving the user component of the application.

When the user terminal's location changes, this information is exchanged in step 474 between the user terminal 410 and the UMM 460. The information exchange can happen according to at least two scenarios. In the first scenario, the user terminal monitors is geographical location and informs the UMM about any change (by using, e.g., GPS coordinates, cell-ID change, Location or Tracking Area Update procedures, etc.). In the second scenario, the UMM monitors the geographical location of the user terminal. Other scenarios for determining the user terminal's location change may be used. The new location of the user terminal is communicated in step 476 to the application manager 450. The application manager 450 determines in step 778 whether the predetermined condition (or conditions) is met at the new location. In other words, the application manager 450 considers one or more constraints associated with (i) a location of the user terminal 310 in the second network area 304, (ii) a location of a cloud component App2 of the application App in a first cloud domain 3206n, and (iii) a location of the second cloud domain 306w associated with the second network area 304.

After evaluating whether the one or more constraints fulfill the predetermined condition for the second cloud domain and for the first cloud domain, the application manager makes the decision to move the application related records 320 from the current cloud domain 306n to the new cloud domain 306w. In one embodiment, the move is performed only when a result of the evaluating step is positive for the new cloud domain 306w and negative for the current cloud domain 306n, i.e., the one or more constraints are fulfilled for the second (new) cloud domain and not for the first (current) cloud domain. It is noted that for evaluating the one or more constraints, the application manager checks the conditions recorded in the MobileAppSubscription.

Thus, in step 780, the application manager 450 moves the application related records (e.g., the cloud component application itself if the new cloud domain does not host it or data related to the application if the new cloud domain already hosts that application) to the new cloud domain. In one embodiment, the application provider may supply the application manager 450 with the application components to be deployed along with the one or more constraints, to be applied at the new distributed cloud for these components. The granularity to which the application is interested to get location update (trigger level) can be specified by the application. This can be for example cell, groups of cells, city, region or country.

The actual decision process for the placement of the cloud components of the application at the new distributed domain can be implemented in at least two ways. In a first scenario, the application manager interacts with the data center and network providers through a distributed cloud application programming interface (API) that provides network and resource information (state, availability, etc.) to the application manager. From the information collected, the application manager takes the appropriate decision on the best application placement.

In the second scenario, the network providers do not give direct information about resource availability to the application manager. However, the network providers may provide an API where the application manager can specify the constraints to be fulfilled and the network provider accepts or rejects the request according to the conditions in its network.

In the case where the user terminal is inactive (no connection to the network, e.g., device turned off) the application manager can decide to clean-up the resources allocated for the user.

Figure 5:
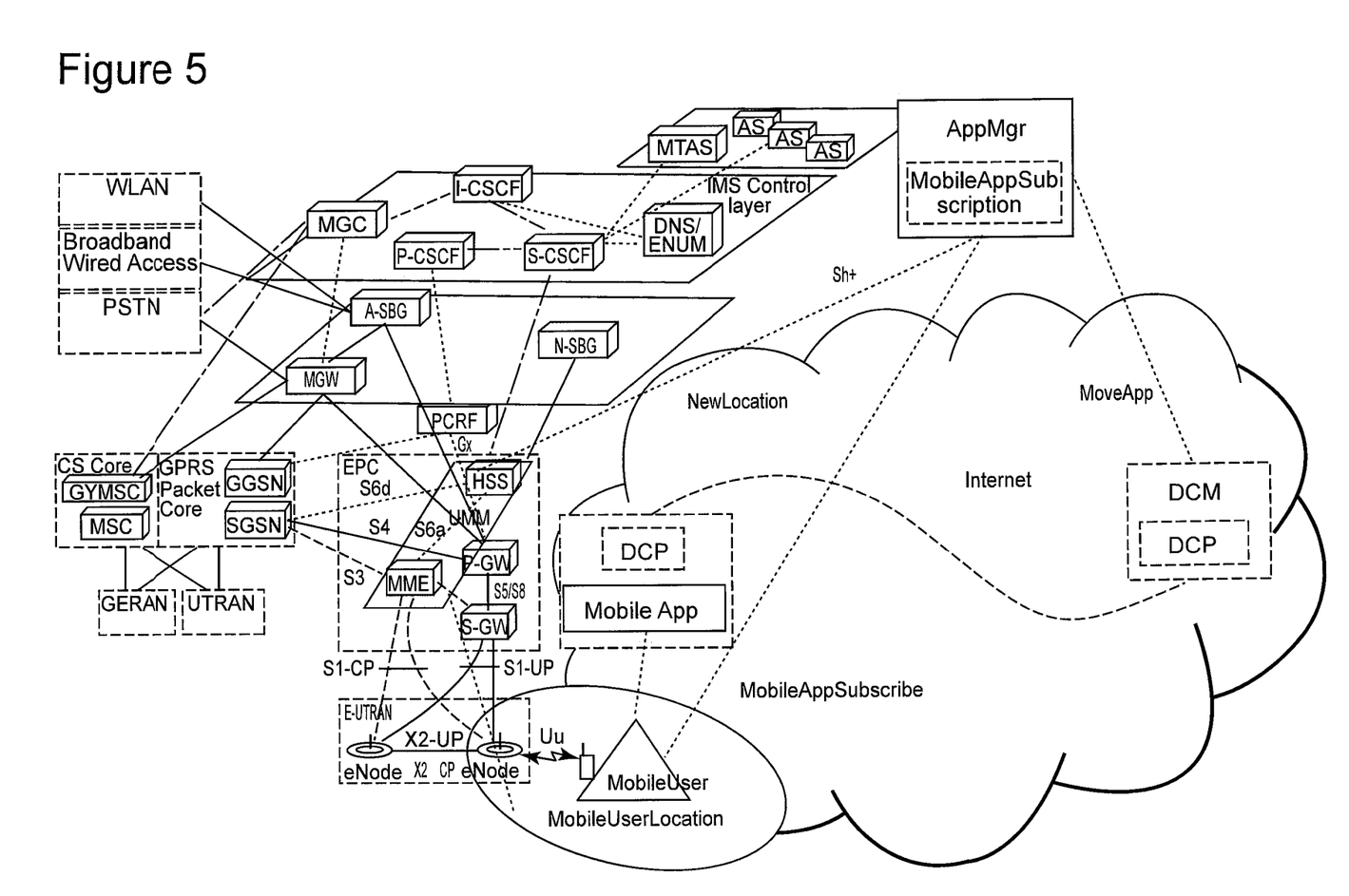
FIG. 5 is a schematic diagram of a 3GPP type network in which application related records are moved from a current cloud domain to a new cloud domain according to an exemplary embodiment.

As discussed earlier, these novel concepts may be implemented in various wireless telecommunication networks. One possible implementation is illustrated in FIG. 5. FIG. 5 illustrates a 3GPP architecture on top of which the novel concepts discussed above (e.g., application manager, mobileappsubscription, UMM) and the distributed cloud tools (DCM and DCP) are implemented. Most of the parts of the 3GPP architecture are known in the art and thus, they are not described herein (just an abbreviation of their name is provided for each component in the figure). It is noted that in this specific implementation, the UMM may be supported by the traditional mobility management entity (MME) and/or the home subscriber server (HSS) and the application manager may be implemented as a new entity.

The above discussed embodiments have one or more advantages over the existing art. Some of these advantages are: improved network resource management by combining the application mobility management with the user mobility management, support for QoS as the application is running in the mobile operator network; reduced latency between the user terminal and the application running in the network; potential reduction of the network traffic in the mobile network by placing the application closer to the end-user; increased security and single sign-on for the user terminal and the application when using the security information management (SIM).

Figure 6:
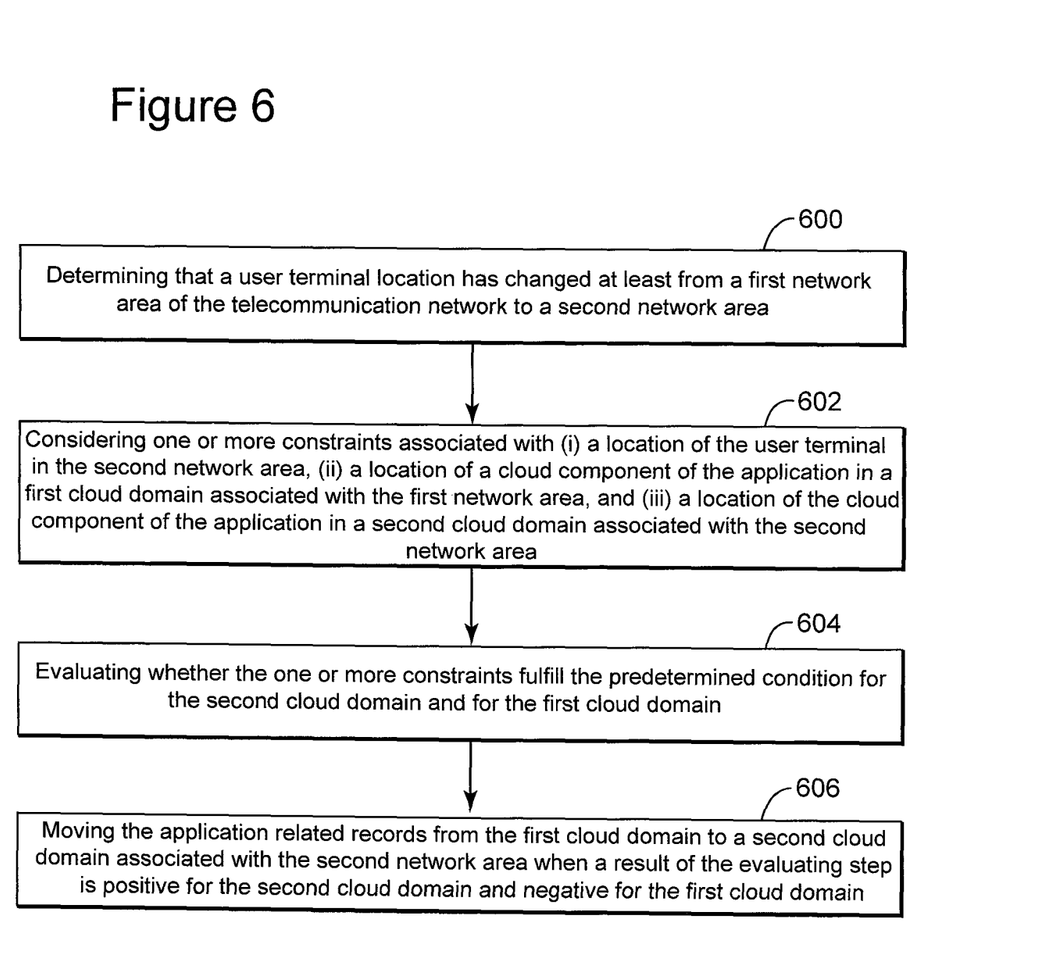
FIG. 6 is a flowchart of a method for moving application related records from a current cloud domain to a new cloud domain when a user terminal changes its location according to an exemplary embodiment.

A generic method for implementing the novel concepts discussed above is presented in FIG. 6. According to the flowchart illustrated in FIG. 6, there is a method for moving application related records (220) between distributed cloud domains (206a to 206w) when a user terminal (210) changes its physical location and a predetermined condition is fulfilled. The user terminal (210) is connected to a telecommunication network (201) and uses an application (App). The method includes a step 600 of determining that a user terminal's location (210a) has changed at least from a first network area (202) of the telecommunication network (201) to a second network area (204). The second network area (204) belongs either to the telecommunication network (201) or to another telecommunication network (203). The method further includes a step 602 of considering one or more constraints associated with (i) a location of the user terminal (210) in the second network area (204), (ii) a location of a cloud component of the application (App) in a first cloud domain (206n) associated with the first network area (201), and (iii) a location of a second cloud domain (206w) associated with the second network area (204), a step 604 of evaluating whether the one or more constraints fulfill the predetermined condition for the second cloud domain (206w) and for the first cloud domain (206n); and a step 606 of moving the application related records (220) from the first cloud domain (206n) to the second cloud domain (206w) when a result of the evaluating step is positive for the second cloud domain (206w) and negative for the first cloud domain (206n). The first and second cloud domains (206n, 206w) may belong to one or more distributed cloud providers.

Figure 7:
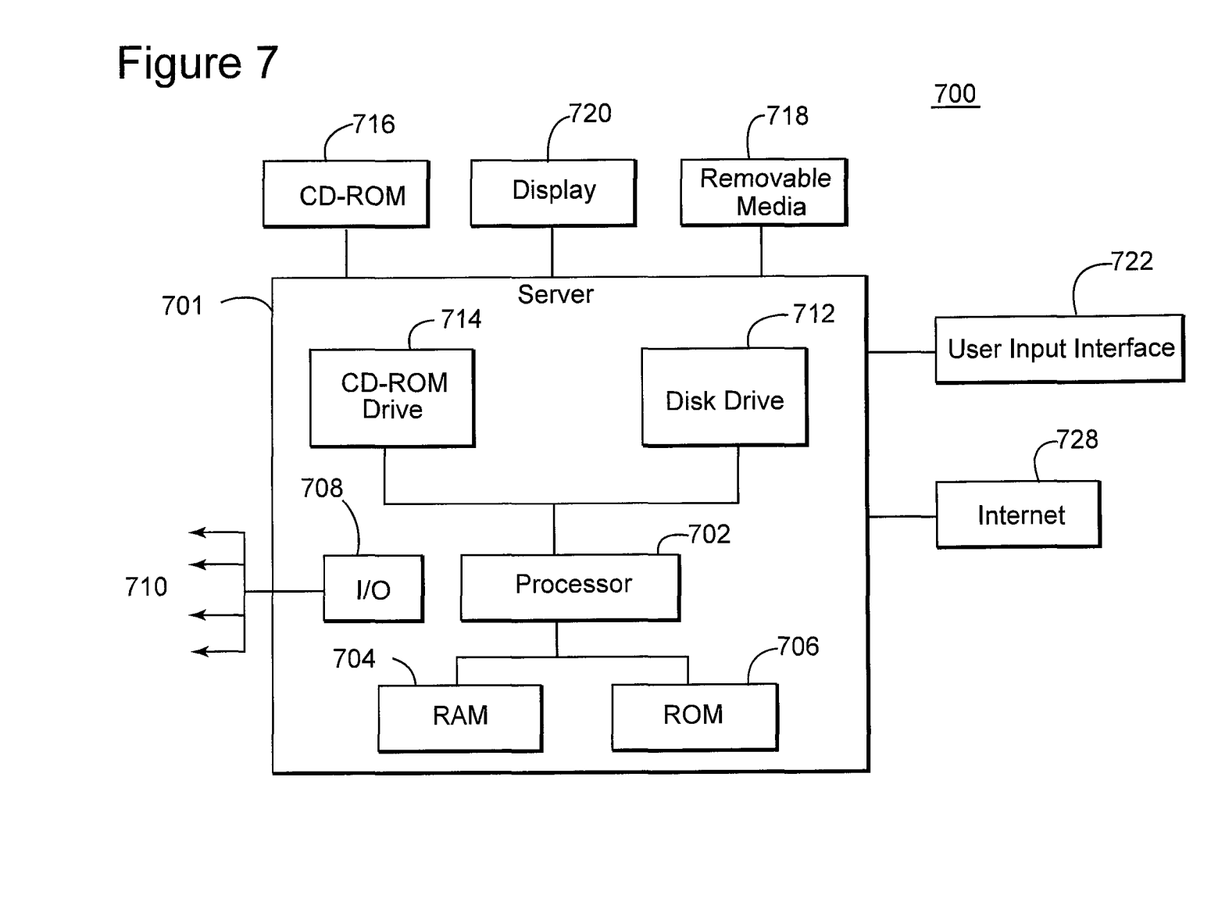
FIG. 7 is a schematic diagram of a processing device in which the method of FIG. 6 may be implemented.

For purposes of illustration and not of limitation, an example of a processing device (e.g., user terminal or base station or a distributed cloud domain) capable of carrying out operations in accordance with the exemplary embodiments is illustrated in FIG. 7. Hardware, firmware, software or a combination thereof may be used to perform the various steps and operations described herein.

The exemplary processing device 700 suitable for performing the activities described in the exemplary embodiments may include or not a server 701. The infrastructure services discussed above may be implemented in the processing device 700, e.g., as a infrastructure service interface. Thus, the infrastructure service interface may include only software instructions or a combination of software and hardware components. The server 701 may include a central processor (CPU) 702 coupled to a random access memory (RAM) 704 and to a read-only memory (ROM) 706. The ROM 706 may also be other types of storage media to store programs, such as programmable ROM (PROM), erasable PROM (EPROM), etc. The processor 702 may communicate with other internal and external components through input/output (I/O) circuitry 708 and bussing 710, to provide control signals and the like. The processor 702 carries out a variety of functions as is known in the art, as dictated by software and/or firmware instructions.

The server 701 is now described. It is noted that as the servers evolve, they may include a subset of the elements described below). The server 701 may also include one or more data storage devices, including hard drives 712, CD-ROM drives 714, and other hardware capable of reading and/or storing information such as DVD, etc. In one embodiment, software for carrying out the above discussed steps may be stored and distributed on a CD-ROM 716, removable media 718 or other form of media capable of portably storing information. These storage media may be inserted into, and read by, devices such as the CD-ROM drive 714, the disk drive 712, etc. The server 701 may be coupled to a display 720, which may be any type of known display or presentation screen, such as LCD displays, LED displays, plasma display, cathode ray tubes (CRT), etc. A user input interface 722 is provided, including one or more user interface mechanisms such as a mouse, keyboard, microphone, touch pad, touch screen, voice-recognition system, etc.

The server 701 may be coupled to other cloud domains (which themselves may have the structure of the processing device 700), such as landline and/or wireless terminals, via a network. The server may be part of a larger network configuration as in a global area network (GAN) such as the Internet 728, which allows ultimate connection to the various landline and/or mobile client devices.

The disclosed exemplary embodiments provide a method and/or mechanism for moving a cloud component application or data associated with it from a current cloud domain to a new domain when a user terminal changes its locations and a predetermined condition is met. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

As also will be appreciated by one skilled in the art, the exemplary embodiments may be embodied in a wireless communication device, a telecommunication network, as a method or in a computer program product. Accordingly, the exemplary embodiments may take the form of an entirely hardware embodiment or an embodiment combining hardware and software aspects. Further, the exemplary embodiments may take the form of a computer program product stored on a computer-readable storage medium having computer-readable instructions embodied in the medium. Any suitable computer readable medium may be utilized including hard disks, CD-ROMs, digital versatile disc (DVD), optical storage devices, or magnetic storage devices such a floppy disk or magnetic tape. Other non-limiting examples of computer readable media include flash-type memories or other known memories.

Although the features and elements of the present exemplary embodiments are described in the embodiments in particular combinations, each feature or element can be used alone without the other features and elements of the embodiments or in various combinations with or without other features and elements disclosed herein. The methods or flow charts provided in the present application may be implemented in a computer program, software, or firmware tangibly embodied in a computer-readable storage medium for execution by a specifically programmed computer or processor.

What is claimed is:

1. A method for moving application related records between distributed cloud domains when a user terminal changes its physical location and a predetermined condition is fulfilled, the user terminal being connected to a telecommunication network and using an application (App), the method comprising:
    determining that a user terminal location has changed at least from a first network area of the telecommunication network to a second network area, wherein the second network area belongs either to the telecommunication network or to another telecommunication network;
    considering one or more constraints associated with (i) a location of the user terminal in the second network area, (ii) a location of a cloud component (App2) of the application (App) in a first cloud domain associated with the first network area, and (iii) a location of a second cloud domain associated with the second network area, wherein the one or more constraints include at least one of network latency, network congestion, available network bandwidth, cloud resource availability, amount of data to be transferred, cost of cloud resources, mobile network signal strength;
    evaluating whether the one or more constraints fulfill the predetermined condition for the second cloud domain and for the first cloud domain; and
    moving the application related records from the first cloud domain to the second cloud domain when a result of the evaluating step is positive for the second cloud domain and negative for the first cloud domain,
    wherein the first and second cloud domains belong to one or more distributed cloud providers,
    wherein the application is associated with a set of parameters selected by a user of the user terminal or provided by an application provider or provided by the telecommunication network,
    wherein the set of parameters selected by the user are specified in a service level agreement between the user and (i) the telecommunication network or (ii) the application provider.

2. The method of claim 1, further comprising:
    when the result of the evaluating step is negative for the second cloud domain and negative for the first cloud domain, either moving the cloud component application (App2) to a default cloud domain or running the application in a degraded mode from the first cloud domain.

3. The method of claim 1, wherein the application related records include software code, related to the cloud component application (App2) when the second cloud domain does not host the cloud component application (App2) and, wherein the application related records include data and no software code when the second cloud domain already hosts the cloud component application (App2).

4. The method of claim 1, wherein the cloud component application (App2) communicates with a corresponding user component application (App1) that runs on the user terminal and the cloud component application (App2) together with the user component application (App1) form the application (App).

5. The method of claim 1, wherein a change in the user terminal's location is considered when the user terminal has moved from one cell to another cell, or from a group of cells to another group of cells, or from a city to another city, or from a region to another region, or from a country to another country.

6. The method of claim 1, wherein the set of parameters includes at least one of an application latency and/or application bandwidth, cost of delivery of the application at selected location, application size, application operating system, and available components at the second cloud domain.

7. The method of claim 1, wherein the one or more constraints further includes a traffic pattern between the application and the user terminal.

8. The method of claim 1, wherein the predetermined condition requires that at least one parameter of the set of parameters has the same or a better value than a value of a corresponding constraint of the one or more constraints.

9. The method of claim 1, wherein the telecommunication network is a 3rd Generation Partnership Project type network or a mobile internet protocol (IP) type network.

10. A system for moving application related records, between distributed cloud domains of a distributed cloud, when a user terminal changes its physical location and a predetermined condition is fulfilled, the user terminal being connected to a telecommunication network and using an application (App), the system comprising:
a managing component configured to determine that a user terminal location has changed at least from a first network area of the telecommunication network to a second network area, wherein the second network area belongs either to the telecommunication network or to another telecommunication network;
the managing component receiving information regarding one or more constraints associated with (i) a location of the user terminal in the second network area, (ii) a location of a cloud component (App2) of the application (App) in a first cloud domain associated with the first network area, and (iii) a location of a second cloud domain associated with the second network area, wherein the one or more constraints include at least one of network latency, network congestion, available network bandwidth, cloud resource availability, amount of data to be transferred, cost of cloud resources, mobile network signal strength;
the managing component deciding whether the one or more constraints fulfill the predetermined condition for the second cloud domain and for the first cloud domain; and
the managing component instructing, through a distributed cloud plane, a distributed cloud manager to move the application related records from the first cloud domain to the second cloud domain when a result of the evaluating step is positive for the second cloud domain and negative for the first cloud domain,
wherein the first and second cloud domains belong to one or more distributed cloud providers,
wherein the application is associated with a set of parameters selected by a user of the user terminal or provided by an application provider or provided by the telecommunication network, and
wherein the set of parameters selected by the user are specified in a service level agreement between the user and (i) the telecommunication network or (ii) the application provider.

11. The system of claim 10, further comprising:
when the result of the evaluating step is negative for the second cloud domain and negative for the first cloud domain, either moving the cloud component application (App2) to a default cloud domain or running the application in a degraded mode from the first cloud domain.

12. The system of claim 10, wherein the application related records include software code, related to the cloud component application (App2), when the second cloud domain does not host the cloud component application (App2), and wherein the application related records include data and no software code when the second cloud domain already hosts the cloud component application.

13. The system of claim 10, wherein the cloud component application (App2) communicates with a corresponding user component application (App1) that runs on the user terminal and the cloud component application (App2) together with the user component application (App1) form the application (App).

14. The system of claim 10, wherein a change in the user terminal location is considered when the user terminal has moved from one cell to another cell, or from a group of cells to another group of cells, or from a city to another city, or from a region to another region, or from a country to another country.

15. The system of claim 10, wherein the distributed cloud management is located in the distributed cloud, the managing component is located in the telecommunication network, and the distributed control plane is spread among the distributed cloud, the telecommunication network and the other telecommunication network.

16. The system of claim 10, wherein the managing component comprises:
an application manager that manages the application; and
a user mobility manager that monitor the location of the user terminal,
wherein the user mobility manager informs the application manager when the location of the user terminal has changed.

17. The system of claim 10, wherein the set of parameters includes at least one of an application latency and/or application bandwidth, cost of delivery of the application at selected location, application size, application operating system, and available components at the second cloud domain.

18. The system of claim 10, wherein the one or more constraints further includes a traffic pattern between the application and the user terminal.

19. The system of claim 10, wherein the predetermined condition is evaluated by the application manager and the predetermined condition requires that at least one parameter of the set of parameters has the same or a better value than a value of a corresponding constraint of the one or more constraints.

20. An infrastructure service embedded in a distributed cloud computing environment and a telecommunication network, for moving application related records between distributed cloud domains when a user terminal changes its physical location and a predetermined condition is fulfilled, the user terminal being connected to the telecommunication network and using an application (App), the service comprising:

determining that a user terminal location has changed at least from a first network area of the telecommunication network to a second network area, wherein the second network area belongs either to the telecommunication network or to another telecommunication network;

considering one or more constraints associated with (i) a location of the user terminal in the second network area, (ii) a location of a cloud component of the application (App) in a first cloud domain associated with the first network area, and (iii) a location of a second cloud domain associated with the second network area, wherein the one or more constraints include at least one of network latency, network congestion, available network bandwidth, cloud resource availability, amount of data to be transferred, cost of cloud resources, mobile network signal strength;

evaluating whether the one or more constraints fulfill the predetermined condition for the second cloud domain and for the first cloud domain; and     moving the application related records from the first cloud domain to the second cloud domain when a result of the evaluating step is positive for the second cloud domain and negative for the first cloud domain, wherein the first and second cloud domains belong to one or more distributed cloud providers,     wherein the application is associated with a set of parameters selected by a user of the user terminal or provided by an application provider or provided by the telecommunication network, and     wherein the set of parameters selected by the user are specified in a service level agreement between the user and (i) the telecommunication network or (ii) the application provider.

\* \* \* \* \*